June 14, 1966  J. L. MOON  3,256,436
SCINTILLATION ALPHA COUNTER
Filed May 22, 1963  9 Sheets-Sheet 1

INVENTOR
JACK L. MOON
BY
ATTORNEYS

INVENTOR
JACK L. MOON

BY
ATTORNEYS

June 14, 1966  J. L. MOON  3,256,436
SCINTILLATION ALPHA COUNTER
Filed May 22, 1963  9 Sheets-Sheet 5

INVENTOR
JACK L. MOON

BY
ATTORNEYS

June 14, 1966  J. L. MOON  3,256,436
SCINTILLATION ALPHA COUNTER
Filed May 22, 1963  9 Sheets-Sheet 8

INVENTOR
JACK L. MOON
BY
ATTORNEYS

Fig. 18

United States Patent Office 3,256,436
Patented June 14, 1966

3,256,436
SCINTILLATION ALPHA COUNTER
Jack L. Moon, Santa Fe, N. Mex., assignor to Eberline
Instrument Corporation, Santa Fe, N. Mex.
Filed May 22, 1963, Ser. No. 282,256
13 Claims. (Cl. 250—83.3)

This invention relates to radiation detection and more particularly to a counter in which radiation is detected and the integrated magnitude thereof continuously indicated on indicators such as counter tubes reading in decades. The invention is particularly directed to a counter in which a sample or specimen of material may be placed either within a drawer in the instrument or opposed to a hand carried probe and the radiation therefrom shown on the indicator.

Briefly stated, the device is constructed on three chassis which are mounted within a housing or cabinet. The first chassis includes control and power supply components, the second detector components, and the third indicator components.

On the first chassis power line input is fed into low and high voltage creating supplies and also into a timer. The high voltage supply feeds the detector chassis. The chassis includes a relay which in one switching position is connected to the detector within the cabinet and in another is connected to a jack to which an external detector or probe may be connected. The sample to be checked may be placed in a light-tight drawer which is pushed into the cabinet with the sample in a position to be in proximity to the internal detector. Closing the drawer switches the power to the internal detector. Opening the drawer operates the relay to cut off power from the internal detector and switches it to the external detector jack. Thus, the possibility of damaging the internal detector by light coming through the open drawer is eliminated.

The indicator chassis mounts an amplifier-trigger and a pulse discriminator, a count relay and six decade counter cards, each of the cards being identical. The amplifier-trigger is connected to the internal detector head or the external probe by the wire which supplies power to the detector or probe and the trigger is operated by reason of changes of potential in this wire.

It is an object of this invention to provide an instrument which shall indicate in the decimal system the integrated magnitude of radiation from a sample tested by the instrument.

It is a further object, in a radiation counting instrument, to provide the same with a drawer in which a sample to be tested may be placed so that the drawer may be slid into the instrument cabinet for subjection to the test.

Another object of the invention is to provide in a radiation counting instrument a detector within the cabinet in a position opposite to the sample in the drawer to pick up the radiation therefrom.

Still another object is to prevent electrical injury to the detector, upon opening of the drawer, due to too much light striking the detector.

Yet another object of the invention is to provide means to enable the switching of high potential from the internal detector to a jack on the instrument and into which an external detector lead may be connected, said switching being under control of the position of the drawer.

Another object is to provide compact and neatly arranged circuitry within the casing involving the use of printed or etched circuitry on plug-in cards.

Other objects will become apparent upon consideration of the following specification, when taken in conjunction with accompanying drawings in which.

Now referring to the drawings in greater detail, the instrument comprises a cabinet or housing 10 and a three windowed cover 11 secured to a flange structure 12 suitably secured, interiorly, to side walls 13 of the cabinet. The cabinet houses three separate chassis 13, 14 and 15. The chassis 13 mounts both the control and the power supply for the instrument; the chassis 14 supports the detector head; and the chassis 15 mounts the indicator and decade chassis. The three chassis are maintained within the casing by screws indicated as 16 holding panels of the respective chassis to the windowed cover 11. The back of the cabinet is closed by a cover 17 suitably screwed to a recessed flange member 12' at the rear of the cabinet.

*The detector head and associated mechanism*

Slidable in a channel or guide 18 of the chassis 14 is a slide drawer 20. The drawer has a circular internally threaded recess 22 in which is screwed from beneath the drawer a sample holder 24, the top of the holder being adjusted in height as desired to accommodate a sample of material, as disc 26, whose radiation is to be tested. To facilitate the sliding of the drawer on the chassis, the chassis is provided with two rails 28, one near each longitudinal side of the guide, the bars being suitably screwed to the chassis as by screws 29 and said bars underlying the bottom surface of the drawer. The rear end of the drawer has secured thereto a stop lug 30, as by screws 32, the stop lug serving to limit the withdrawal movement of the drawer through the front of the machine, by engagement of the lug 30 with the rear end of chassis 14. The front end of the drawer has a bevelled plate 40 secured thereto by screws 42, and to the bevelled plate is fastened a bail or handle 44 secured to the bevelled plate in any suitable manner.

Surmounting the chassis 14, substantially midway of the length of the chassis is a detector head assembly 50. The assembly comprises a generally cylindrical phototube housing 52 with its lower end reduced in diameter as indicated at 54 to fit snugly in a corresponding pocket in a mounting ring 56, suitably fastened to the side rib portions of the guide 18 as by screws 58, a light tight resilient compressible ring 60 being interposed between the phototube housing and the drawer and wiping across the upper face of the drawer during drawer movement, to exclude stray light from the interior of the housing which may deleteriously affect the phototube 61 within the housing. The cylindrical housing 52 is held to the ring by suitable screws 62 threaded into the ring and engaging an O-ring 63 set into the mounting ring and surrounding the reduced end portion of the cylinder. The shouldered portion 64 of the ring fits in light tight engagement against the upper surface of the ring.

Figure 6:
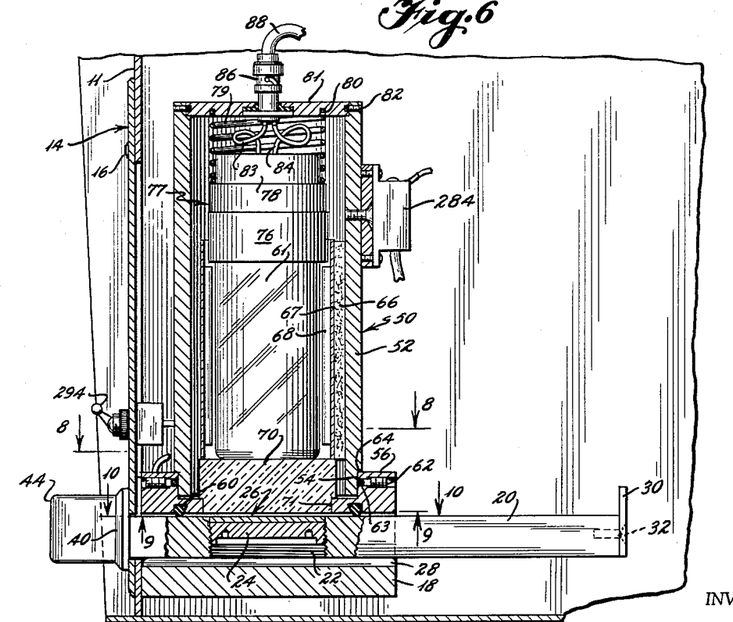
FIG. 6 is a section on the line 6—6 of FIG. 5.
Figure 7:
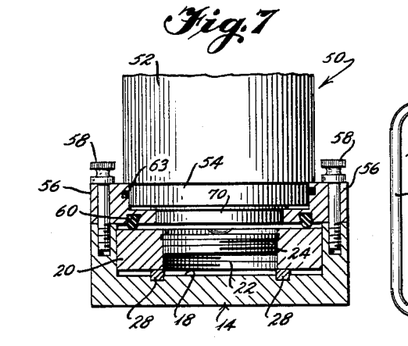
FIG. 7 is a section on the line 7—7 of FIG. 5.
Figure 8:
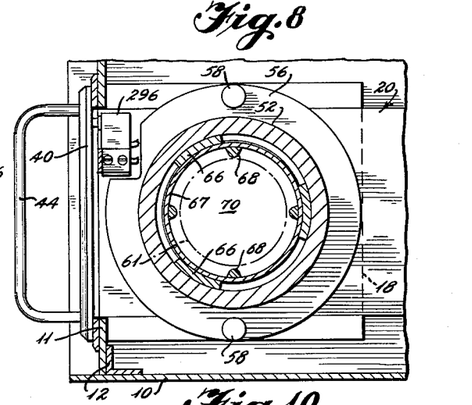
FIG. 8 is a section on the line 8—8 of FIG. 6.
Figure 9:
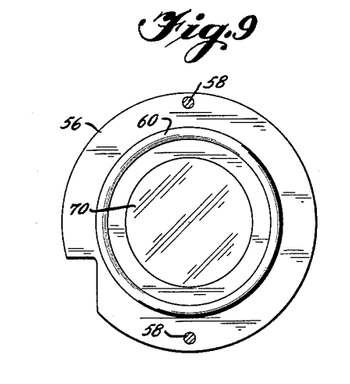
FIG. 9 is a view of the bottom of a crystal and adjacent parts looking in the direction of the arrows 9—9 in FIG. 6.
Figure 10:
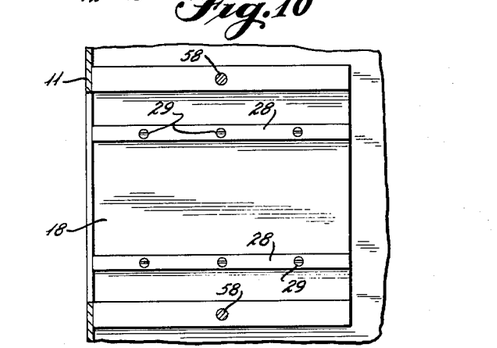
FIG. 10 is a section on the line 10—10 of FIG. 6 with the drawer removed.
Figure 11:
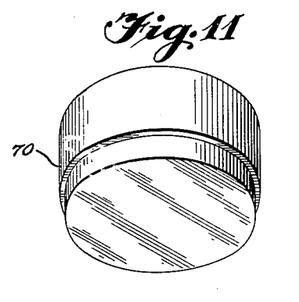
FIG. 11 is a perspective view of the crystal shown in FIG. 6.
Figure 12:
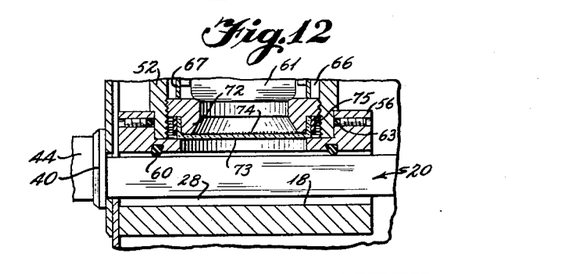
FIG. 12 is a cross-section through a modified form of scintillation responsive medium utilized in place of the crystal and adjoining parts shown in FIG. 6.
Figures 13, 19:
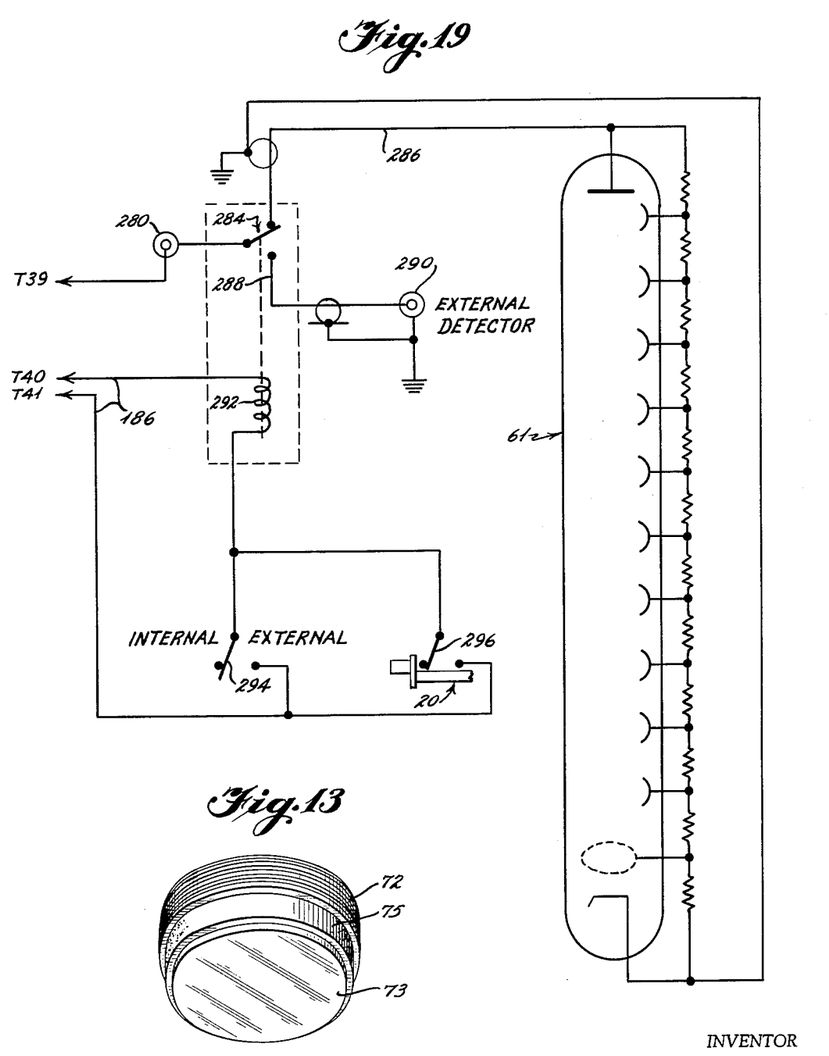
FIG. 13 is a perspective view of the scintillation responsive medium shown in section in FIG. 12.
FIG. 19 is a circuit diagram showing wiring connections to and control of the potentials applied to both an internal scintillation detector within the casing and to an external detector adapted to be plugged into the instrument.

Within the housing 52 are spaced pads 66 to cushion a cylinder 67 provided with ribs 68 to center the photomultiplier tube 61. The lower end of the tube 61 is held in engagement with a crystal 70, as shown in section in FIG. 6. The crystal has a reduced in diameter portion 71 fitting in a flanged portion of the mounting ring 56. The crystal itself may be of any type known in the art as a block of transparent material having dispersed therethrough a phosphor including silver activated zinc sulphate. In lieu of the crystal 70, and as shown in FIGS. 12 and 13, there may be utilized an externally threaded ring 72 threaded into the lower end of phototube housing 52. The ring is capped with a transparent cover 73 having an upper adhesive face on which is an even thin layer of a zinc sulphide scintillation screen 74. A clamping band 75 holds the cover, which may be of the character of Scotch tape, onto the lower end of the torus. The upper end of the phototube 61 is provided with a conventional base 76 with prongs fitted into a socket 77 having a shouldered portion 78. A spring 79 reacting between the shouldered portion of the socket and a circular groove 80 in the underside of a light excluding cap 81, fitted onto a shouldered portion of the housing, maintains the lower end of the phototube in resilient engagement with the crystal, see FIG. 6, or with the torus as in FIG. 12. The cap 81 is fastened to the housing by screws 82. Conductors 83 and 84 from the phototube socket lead to a bayonet joint plug connector 86, and thence via a shielded cable 88 to other parts of the instrument. One of the leads is connected to ground, the other to the high voltage source provided by the power supply. The lower face of the crystal 70, or its equivalent structure, is exposed to the sample on the drawer since it lies in the recess by reason of the central opening in the ring 56 and is directly over the sample when the drawer is closed.

*Power supplies*

Figure 4:
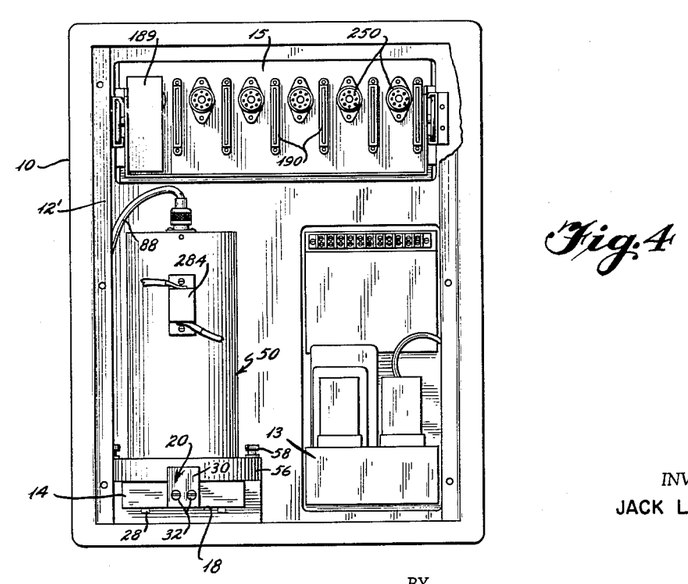
FIG. 4 is a rear view of the instrument and with the rear cover removed, part of the rear flanged portion of the cabinet enclosing the instrument being broken away.
Figure 5:
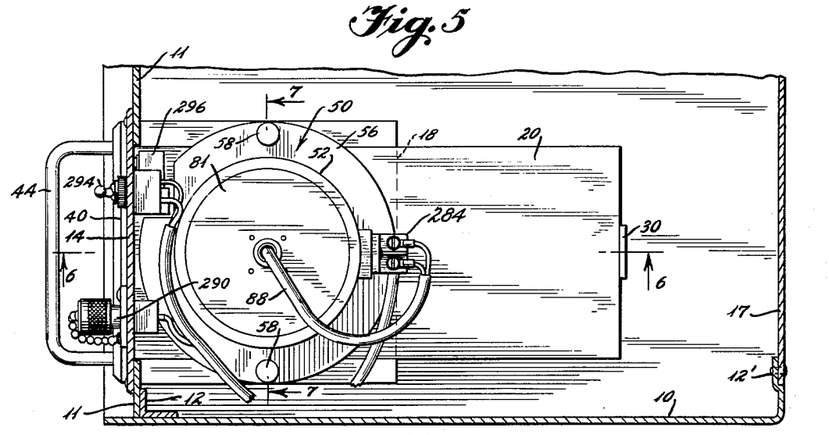
FIG. 5 is a section on the line 5—5 of FIG. 3.
Figure 14:
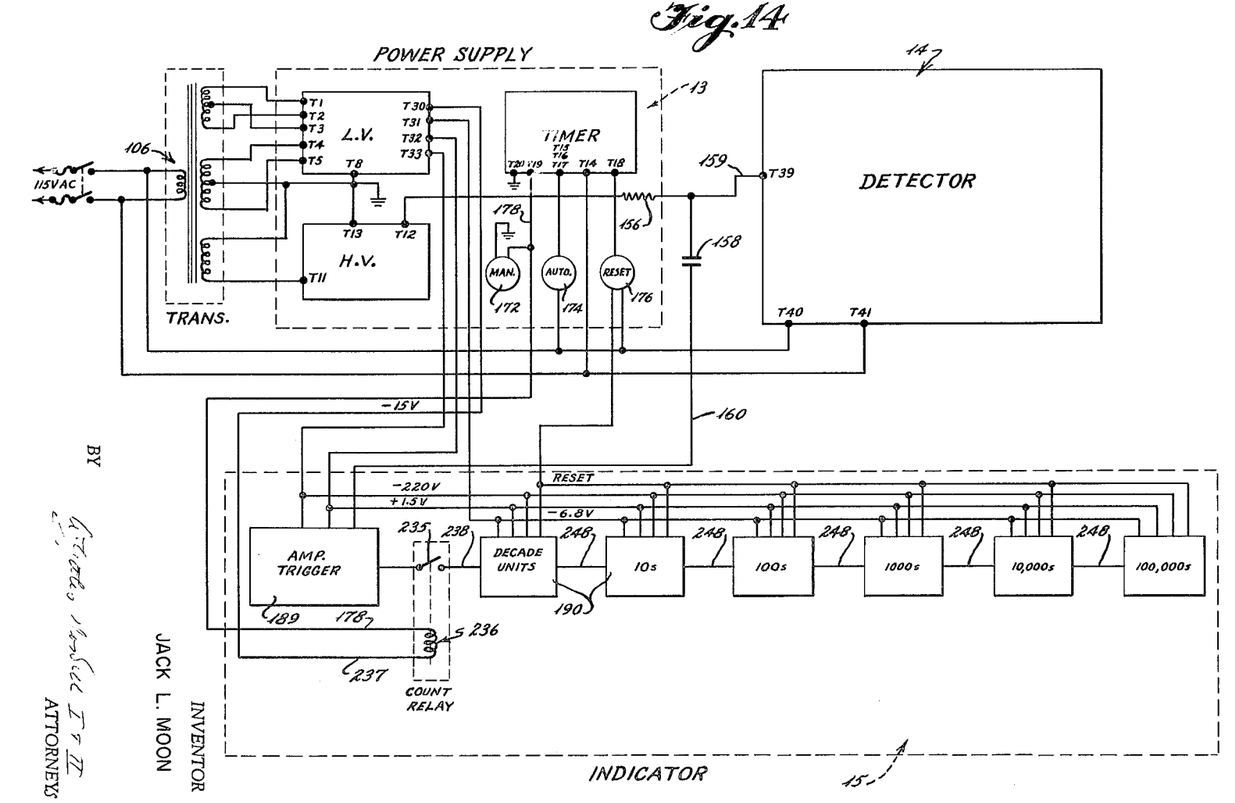
FIG. 14 is a flow diagram of the electrical components in the instrument.

To the right of the detector chassis as viewed from the rear of the instrument, see FIG. 4, is the power supply and control chassis 13. This chassis contains a low voltage power supply, a high voltage power supply, an automatic reset timer and four control switches of the instrument. The relationship of these elements to the remaining portions of the instrument is shown in FIG. 14. The circuit diagram of this chassis is shown in FIG. 15.

Figure 15:
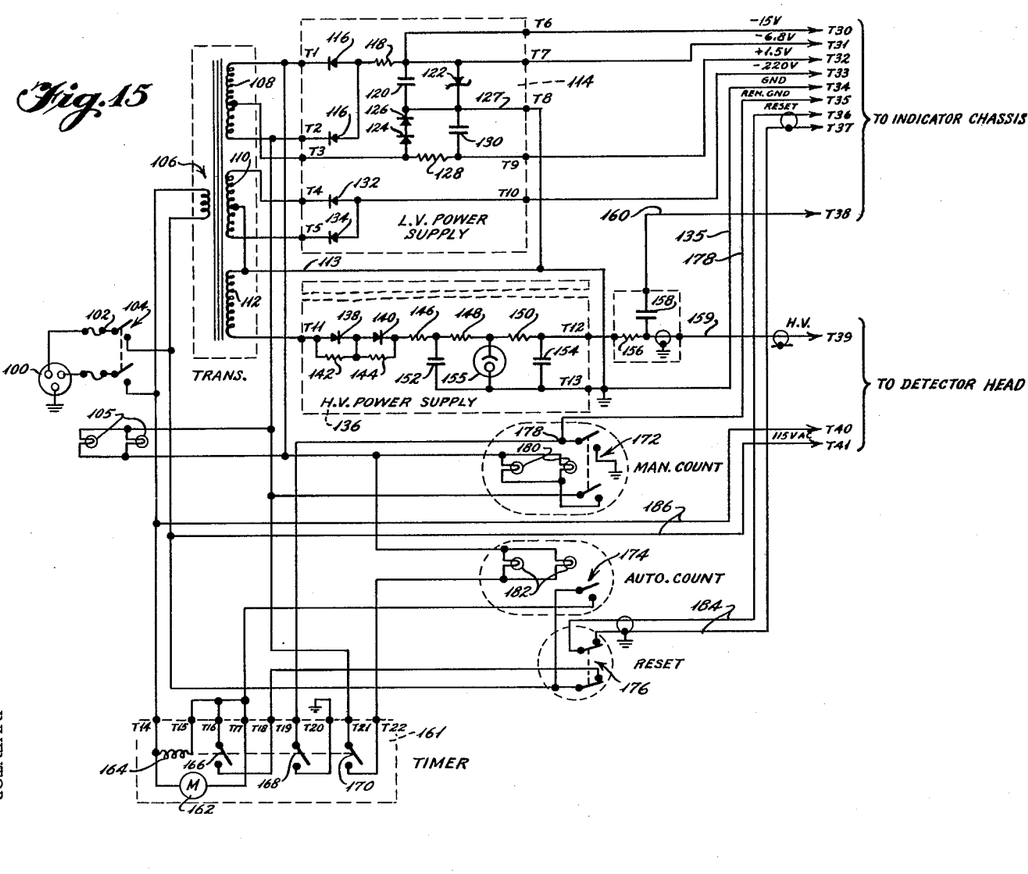
FIG. 15 is a diagram showing the circuitry of the low and high voltage power supply and of a timer utilized with the instrument.

Adverting to FIG. 15 there is shown a plug 100, with ground terminal, adapted to be connected to a conventional 115 volt house current 60 cycle A.C. supply, the plug leading via leads fused as at 102 to a double pole, single throw, power switch 104. The switch houses a pair of parallel-connected low voltage indicator lights 105 for convenience in determining when the switch is on. The switch feeds the primary of a transformer 106 as well as other instrumentalities in parallel, which will be described. The power transformer has three secondaries 108, 110 and 112; secondary 108 is a center tapped 24 volt winding yielding 12 volts on each side of the center tap, the 24 volt supply feeding the lights 105. A secondary 110 is a center tapped 440 volt winding, the center tap being connected to a terminal of the third secondary 112 and via line 113 to ground. Said third secondary is wound to deliver a voltage of about 1550 volts.

*Low voltage power supply*

The secondaries 108 and 110 of the transformer 106 are connected to terminals T1 to T5 on an etched circuit card 114, whose boundary is indicated by dotted lines in FIG. 15, the card being suitably mounted on the chassis 13, the output terminals from this card being indicated as T6 to T10. The secondary winding 108 and a pair of diodes 116 fully rectify the A.C. current, said rectified current being filtered by resistor 118 and capacitor 120 and voltage regulated by zener diode 122. The line from the center tap on transformer secondary 108 is connected to capacitor 120 by two diodes 124 and 126 in series, a ground line 117 being tapped in between the capacitor 120 and the diode 126. The arrangement is such that terminal T7 is voltage regulated and is 6.8 volts negative with respect to ground terminal T8. Terminal T6 is directly connected to the junction between the resistor 118 and capacitor 120, with the result that this terminal is at 15 volts negative with respect to ground. Still another terminal T9 is at 1.5 volts positive with respect to ground since this last terminal, on the card, is connected to a series resistor 128 in the center tap line of secondary 108. The current in the +1.5 volt line is filtered by reason of this resistor and capacitor 130 across the line. The current from the 440 volt winding of the transformer is fully rectified by diodes 132 and 134 with no filtering and a center tap of the coil is grounded via line 113. The resulting 220 volt pulsating current is led to terminal T10. The various outputs from terminals T6 to T10, as well as a permanently grounded line 135, lead to the indicator or decade chassis 15. All terminals having like potentials and intended to be connected to each other have the same T and numeral designation.

*High voltage power supply*

The high voltage in secondary winding 112 is connected to an input terminal T11 on a second etched card 136 whose boundary is shown in dotted lines in FIG. 15, the card being suitably mounted on the chassis 13. This card is of the same size as card 114. It has output terminals T12 and T13 leading to the detector head chassis 14.

The circuitry on the card 136 is such as to take the output from the 1550 volt winding 112, half wave rectify the same and regulate the resulting output with a voltage regulator. Specifically the A.C. voltage is half wave rectified by series connected diodes 138 and 140, these being shunted by resistors 142 and 144, the resistors being provided to equalize voltage drops in reverse direction if one diode has lower inherent leakage than the other, so that neither diode will exceed its peak inverse voltage rating. The rectified current is then fed through the filter consisting of the resistors 146, 148 and 150 and the capacitors 152 and 154, the voltage being regulated by the voltage regulating tube 155. Terminal T13 is connected to ground and, as shown in this drawing, to the capacitors 152 and 154 and voltage regulator tube 155. The output terminal T12 is led to a shielded space within which is a current limiting resistor 156 and capacitor 158. The resistor is connected via a shielded line 159 and other instrumentalities, as will be described, to the anode of the photomultiplier tube on the chassis 14. In fact all of the cables or lines leading to the several chassis are shielded to eliminate or attenuate noise. The resistor 156 will limit current flow in the high voltage line to a safe value should an operator contact the high voltage lead feeding the tube. The function of the capacitor 158 is to receive signals from the line 159 connected with the photomultiplier tube; as the current in the tube varies in response to sample reading the resulting changes in voltage are transmitted via line 160 to a trigger amplifier on the chassis 15.

Control

Figure 1:
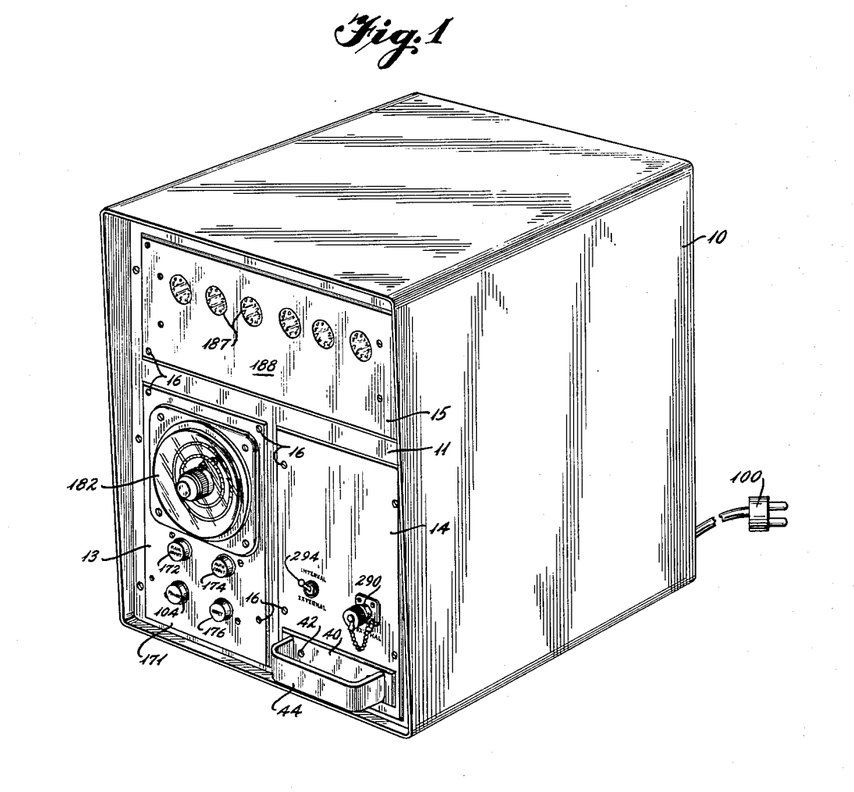
FIG. 1 is a perspective view of the exterior of the instrument.
Figure 2:
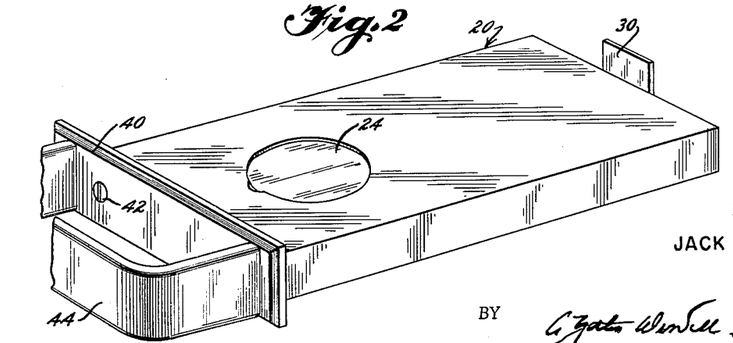
FIG. 2 is a perspective view of a drawer forming part of the instrument.
Figure 3:
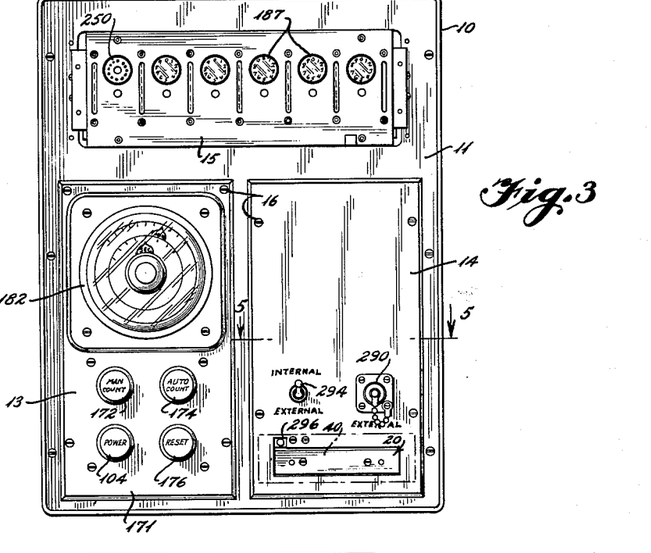
FIG. 3 is a front view of the instrument with a cover panel, over an indicator portion at the top of the instrument, removed.

The timer is mounted on a card 161 and it carries a timer motor 162, a relay coil 164, three switches 166, 168 and 170 controlled by the coil, and terminals T14 to T22. On an upright panel 171 forming part of the chassis 13, see FIG. 1, are push buttons operating specific switches as will be made clear. The buttons are designated "Power" for the switch 104, "Manual Count" for a switch 172, "Auto Count" for a normally open, momentarily closed switch 174, and "Reset" for a normally closed, momentarily open switch 176. The count control switches 172 and 174 are utilized to turn the instrument "on" so it will count in response to quick pulses. This can be accomplished in two ways. The manual count switch 172 is an on-and-off switch operated by successive pushes on its associated button. When it is first pushed in the circuit will close and the instrument will count, the next push will open the circuit and the count will cease, and so on. When the switch 172 is closed, the ground circuit to the counter on the decade chassis is closed via a line 178. Also the circuit through parallelly connected lights 180 in its associated "Manual Count" button is connected with the secondary 108 of the transformer across one half of the winding. Thus the decade counter will operate and the lights 180 will be lit so long as the circuit is closed.

On momentary closure of switch 174, by operation of the "Auto Count" button, the 115 volt A.C. line is closed to the relay coil 164 in the timer and to the motor 162. The energization of coil 164 closes switch 166, which maintains the coil energized via the closed "Reset" switch 176 until the timer opens said switch 166. The timer is of a conventional type and can be hand set for any desired period of time, for example, from 0 to 20 minutes, the hand settable knob being shown at 182 in FIG. 1. Energization of relay coil 164 also closes switches 168 and 170. Switch 168 is connected with line 178 and therethrough places ground potential on the decade counter. Switch 170 closes the 12 volt circuit to the bulbs 182 in the button of switch 174. Momentary operation of reset switch 176 opens the circuit to serially connected switch 166, thereby de-energizing the timer relay coil 164 and allowing the switches 166, 168 and 170 to open and the timer motor to stop. The timer is also of the conventional type which resets to zero on the relay coil being de-energized. Also such momentary opening and closing of the switch 176 resets the decade counter via the lines 184, one of which is a grounded sheath. The power supply chassis also has branch leads 186 to furnish 115 volts A.C. to the detector head chassis.

The indicator and decade chassis

The chassis 15 has mounted thereon six count indicator tubes 187 which are visible through windows in the top front cover 188. The chassis also mounts one amplifier-trigger card 189 and six plug-in type decade counter cards 190, to be later described in greater detail, each card involving an etched or printed circuit and associated electrical components as transistors, capacitors and resistors, the circuitry on the decade cards feeding the counter tubes.

The amplifier-trigger

Figure 16:
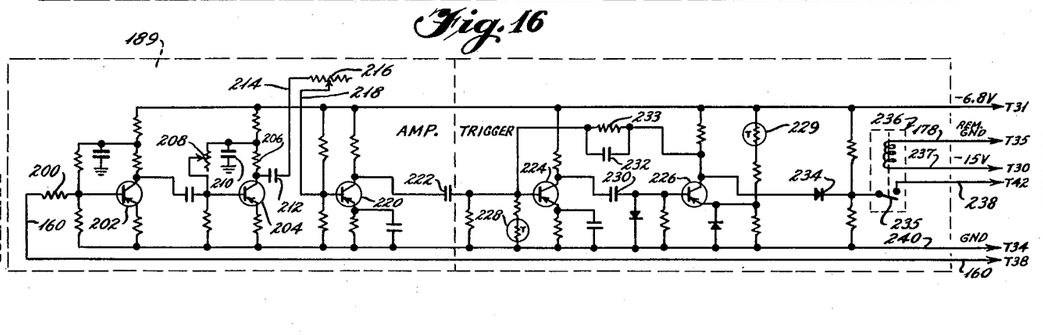
FIG. 16 is a circuit diagram of an amplifier-trigger utilized in conjunction with the instrument.

The amplifier-trigger, see FIG. 16, receives signals from the detector head by reason of pulsations in the high voltage line 159 leading to the photomultiplier tube and via the capacitor 158, FIG. 15 and line 160, these signals are fed to the amplifier-trigger. The line 160 feeds via a protective resistor 200 into the base of a transistor 202. The resistor 200 protects the transistor 202 in the event of extraordinary violent voltage changes at the detector head, so as to prevent ruining the transistor. In conventional fashion the pulse from the detector head impressed on the base of transistor 202 is coupled into transistor 204 for amplification. The amplified signal is picked off from the collector on transistor 204 and fed back into the base of the transistor via a discriminator consisting of a low value series resistor 206 and much higher value potentiometer 208 and shunt capacitor 210 connected to the juncture between the resistor and potentiometer and to ground. The discriminator makes a variable voltage divider for the incoming pulse. With zero resistance in the potentiometer, substantially the full pulse will be coupled back into the transistor; as more resistance is added to the discriminator circuit in the potentiometer, the pulse is attenuated, decreasing the overall gain of the amplifier. The range of attenuation is 100 to 1. Considering the overall sensitivity of the amplifier and associated trigger, to be described, the voltage range is from about one millivolt to one hundred millivolts input sensitivity. The output from the transistor 204 is fed via a capacitor 212 and line 214 to a second potentiometer 216 for overall gain control and thence back via a line 218 to the base of transistor 220 for further amplification of the pulse. From the collector of transistor 220, the pulse is fed via a capacitor 222 to a multivibrator consisting of transistors 224 and 226, temperature stabilized to prevent injury to the transistors by thermistors 228 and 229 and wherein the collector to base couplings include a capacitor 230 of comparatively large value, as 470 mmf., and a second resistance bypassed capacitor 232 of comparatively small value, as 50 mmf., the bypass resistor 233 being selected such as to result in a monostable multivibrator having a pulse width of about four microseconds. The output from the trigger is taken from the collector of transistor 226. At this point, the pulse is positive-going, 4 microseconds long, and has an amplitude of about 6 volts. This pulse is transmitted via a diode 234 to a switch armature 235 of a count relay 236. The purpose of the diode is to isolate the trigger circuit from any noise or electrical transients that might get in the output line and feed back into the trigger causing actually non-existent counts to appear on the indicator.

The count relay coil has connected thereto removable ground line 178, previously referred to, and line 237, the line 237 having −15 volt potential placed thereon and the lead 178 having ground marked thereon by closure either of the manual switch 172, FIG. 15 or of the timer switch 168. Any time that the count relay is actuated, the signal is applied to output line 238 and thence to the decade counter. A suitable ground line 240 is connected to the various elements in the trigger amplifier, as indicated in the drawing.

The decade counter

Figure 17:
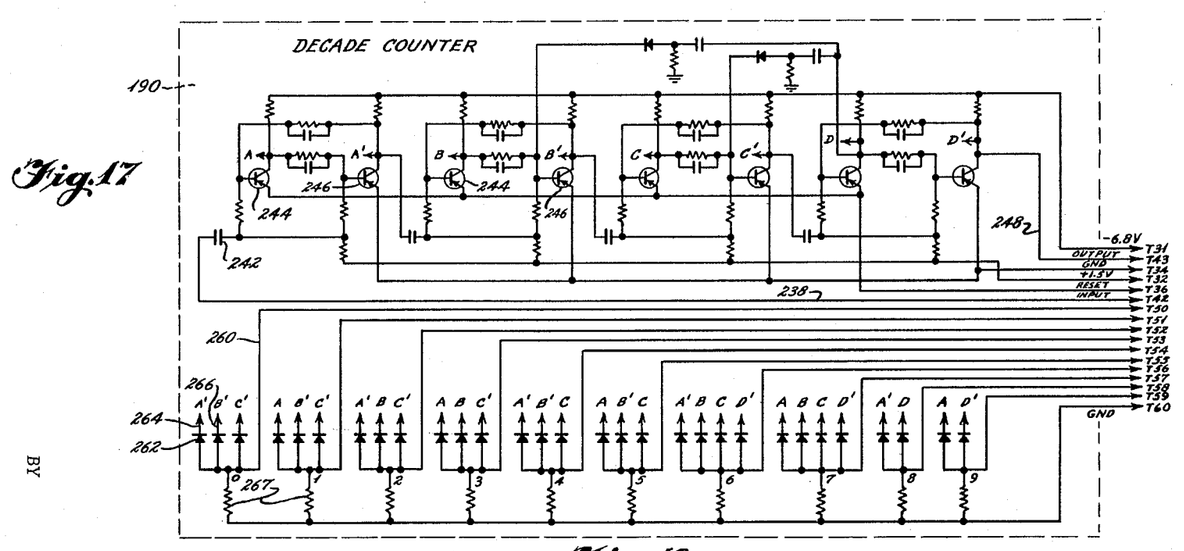
FIG. 17 is a circuit diagram of a decade counter or binary to decimal converter utilized in the instrument.

The decade counter comprises in part a number of like plug-in cards 190, FIG. 17, adapted to plug into the decade chassis 15, vertically alongside of the counter tube sockets.

The decade counter is of the type which converts a binary count into a count in the decimal system. For a clear understanding of the operation of such a counter, reference is made to Millman & Traub—Pulse & Digital Circuits, pages 327 to 330, McGraw-Hill Book Co., Inc., 1956. In the instance shown in FIG. 17, each order of the counter comprises a card with four serially connected sets of transistor multivibrators or binaries, with the input line feeding via a capacitor 242 into the base of the first one of the transistors 244 of a pair of transistors 244, 246 forming a bistable multivibrator or binary. Whereas the normal count through the four sets of binaries would be 16 before the device would reset itself to zero, by feeding back certain pulses, the count actually applied to the device is reduced to 10. As shown herein, the feed back comes off of the first collector of the last binary and feeds back into the bases of the second transistors of the second and third binaries. The feed back to the second binary is the equivalent of adding two extra pulses to the input of the device and the feed back to the third binary is the equivalent of adding four pulses at the input to the device. Thus when ten pulses are applied to the counter via the capacitor 242, the equivalent of 16 pulses are transmitted through the counter, creating a pulse at the output from the device via decade output line 248 which transmits the pulse to the input of the next decade plug-in card. The first counter counts the units, the next counts tens, and so on for six decimal places, although obviously more counters could be utilized.

Figure 18:
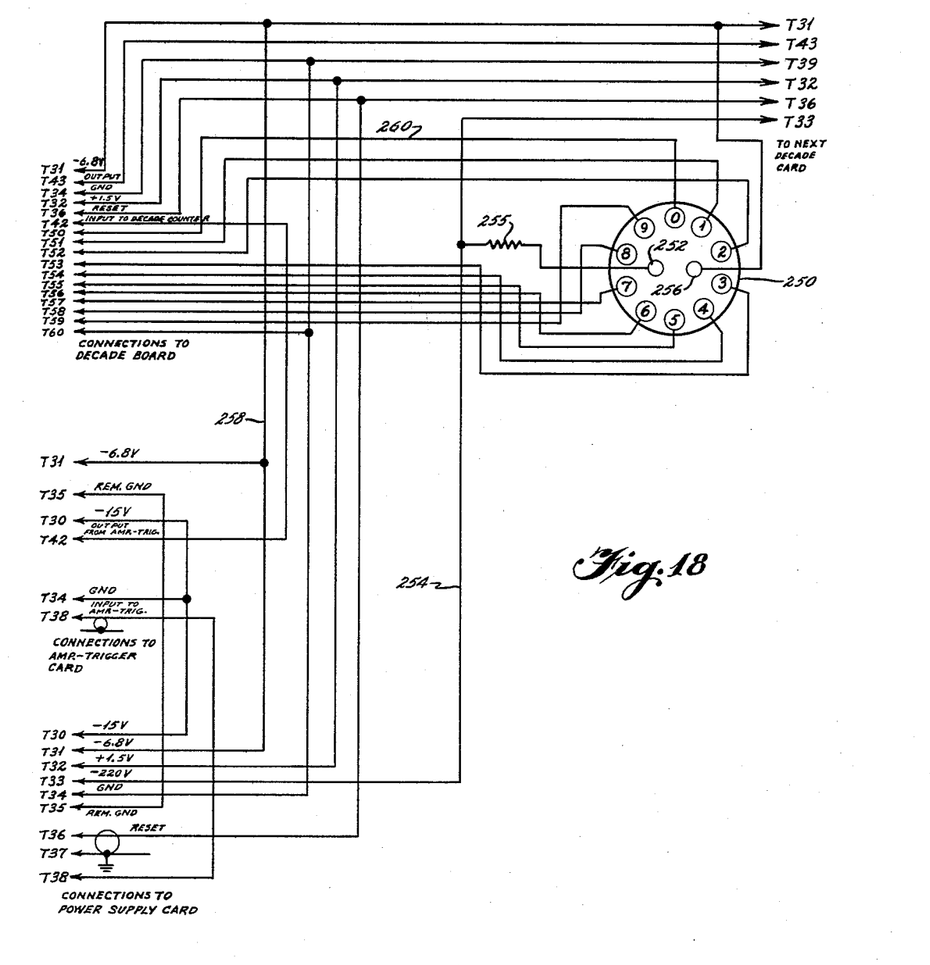
FIG. 18 is a circuit diagram showing a decade counter tube socket and associated wiring.

Mounted on the chassis 15, between the decade counter cards, are sockets 250 (the wiring to which is not illustrated in FIG. 4 for the sake of clarity), each of which has 10 circumferential contacts (see FIG. 18) and two other contacts, one contact 252, for connection with the —220 volt line 254 through a suitable protective resistor 255, and the other contact, contact 256, for connection with the —6.8 v. line 258. In the sockets there are adapted to plug in any of various known counter tubes as for example a type of tube having an anode for connection with terminal 256, a cathode for connection with terminal 252 and ten plates, with 220 volts as the firing potential and 6.8 volts as the switching potential. The circumferential contacts on the tubes are connected by ten leads, for example lead 260, to pulse receiving diodes 262 in turn connected by wires 264, 266, et cetera with output terminals at the collectors of the respective transistors to properly indicate on the ten leads the stage of count of the counters. The connections to the collector outputs of the binaries and the diodes 262 are correlated in FIG. 17 by the characters A, B, C and D and their primes. At any state of the decade counter, nine of these leads, of which lead 260 is an example, will be at ground potential and one will be at —6.8 volts. Where there is a control voltage of —6.8 volts close to the anode the associated portion of the anode of the indicator tube will be unlit. The diodes in each group constitute part of an "OR" gate circuit so that should any transistor of the binaries be conducting, the potential at the collector electrode would rise to substantially ground potential. Thus in the zero condition of the binaries, the transistors with terminals A, B, C and D are conducting and those with terminals A', B', C' and D' are not conducting. Therefore, line 260 has no ground potential on it while the corresponding lines do have ground potential. On the next pulse the terminal A' has ground potential on it while the terminal A of the next gate loses its ground potential and instead has a potential of approximately —6.8 volts impressed on it. Thus the indicator tube is triggered to a "one" indication and so on. The light in the indicator tube will be extinguished at each half cycle of the 220 volt A.C. line and the new count showing on the tube will be a function of the number of pulses received by the decade counter between the crests of the A.C. wave. For an explanation of the operation of this type of counter tube employed see Electronic Application v. 22, No. 2, pp. 115–20. Load resistors 267 are utilized to prevent injury to the gate diodes. On the count of 10 the counter resets to zero and the pulse is transmitted to the next decade to show a count of 1 thereon. The various terminals to the decade counter are indicated in FIG. 17. The reset terminal T36 is connected to each of the first of the pairs of binaries to reset the counter to zero upon the receipt of a pulse. The terminal T60 provides for the grounding of the OR gates.

*The external detector*

The high voltage and signal carrying line, see FIG. 19, is connected to a detachable or plug connector 280. A high voltage conductor 282 leads from said connector to the movable pole of a double throw switch 284 suitably mounted on the detector chassis. One fixed contact leads via conductor 286 to the photomultiplier tube. A second fixed contact on the switch is connected to a conductor 288 leading to a jack 290 mounted on the panel of the instrument. Into this jack there may be plugged a cable-connected external detector. Since the external detector forms no part of the invention, it is not shown in detail. The switch 284 is part of a relay which operates to normally maintain the high voltage on the conductor 286. The coil 292 of the relay is adapted to be closed either by manual closure of a two position switch 294 mounted on the panel of the instrument or by closure of microswitch 296 in parallel with switch 294. The microswitch 296 is a normally closed switch mounted on the chassis 14 near the front thereof so that when the drawer is pushed home into the casing, the switch plunger will be engaged and the switch opened. When the drawer is opened slightly, regardless of the position of manually operated switch 294, the circuit to the relay coil will be closed and the high voltage will be transferred from the photomultiplier tube to the corresponding instrumentality in the external detector. The relay coil is supplied with 115 volt current via lines 186 and the switches 294 and 296.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:
1. A detector comprising a cabinet housing a power supply, detector head, a counter and an indicator fed from said counter, said power supply including a high voltage supply, a first conductor connected between the high voltage supply and said detector head, an A.C. impedance tapping said conductor and a second conductor from said impedance to said counter to transmit pulses in said first conductor to said counter.

2. The structure of claim 1 wherein an amplifier and trigger are interposed between the second conductor and the counter.

3. The structure of claim 2 wherein a control relay is interposed between the trigger and the counter.

4. The structure of claim 2 wherein the impedance means is a capacitor.

5. A detector comprising a cabinet housing a power supply, a detector chassis and a combined counter and count indicator, a timer in said cabinet and manual control means therefor to set the time of operation thereof, and a count relay controlled by said timer for establishing and disrupting the circuit from the detector head to the counter.

6. A detector as claimed in claim 5 in which said timer is initiated into operation by momentary closure of a switch.

7. A detector as set forth in claim 5 in which the count relay is energized by a second switch, the relay being energized as long as the second switch is held closed.

8. A detector as set forth in claim 5 in which there is provided a reset switch, momentary opening of said switch discontinuing the operation of the timer and restoring the same to zero.

9. A detector as set forth in claim 8 in which the momentary opening of said switch also causes the counter to reset to zero.

10. A detector comprising a housing including thereon means to receive pulsations from a radiating sample, means to transmit said pulses to a binary counter having a plurality of pairs of binary switching elements, gating circuits, each gating circuit including OR gates connected to the respective switches of the binary elements, the connections being such that at any one time ground potential will exist on one only of the gates, and for each successive pulse current ground potential will pass to the gates in succession, and a counter indicating tube connected with each of the gates to indicate the progress of the ground potential on the gates.

11. A detector as set forth in claim 9 including a combined pulse amplifier and trigger, a binary counter, a conductor between the trigger and the counter and a diode in said conductor to prevent spurious pulses being fed back into the trigger.

12. A radiation detector including a photomultiplier tube and a ring having one open end abutting the tube to conduct light thereto, a transparent covering over the other open end of the torus, an adhesive substance on said covering, and a material held by said adhesive substance, said material fluorescing on being subjected to radiation.

13. A detector as claimed in claim 12 in which the material is zinc sulphide.

References Cited by the Examiner

UNITED STATES PATENTS

| 2,892,091 | 6/1959 | Sawle | 250—71.5 |
| 2,949,534 | 8/1960 | Youmans | 250—71.5 |
| 3,085,155 | 4/1963 | Kern et al. | 250—106 X |
| 3,114,853 | 12/1963 | Packard | 250—106 X |
| 3,176,133 | 3/1965 | McCall et al. | 250—71.5 |

OTHER REFERENCES

Scintillation Counting Chamber, General Purpose, AEC Cat. No. ABX-4B, from Atomic Energy Commission Radiation Instrument Catalog, July 1, 1953 (1 sheet).

RALPH G. NILSON, *Primary Examiner.*

ARCHIE R. BORCHELT, *Examiner.*